Sept. 2, 1952  J. M. LEACH  2,609,083
MATERIAL TRANSFER FOR CONVEYERS
Filed March 17, 1951  2 SHEETS—SHEET 1

INVENTOR.
John M. Leach

Sept. 2, 1952 J. M. LEACH 2,609,083
MATERIAL TRANSFER FOR CONVEYERS
Filed March 17, 1951 2 SHEETS—SHEET 2
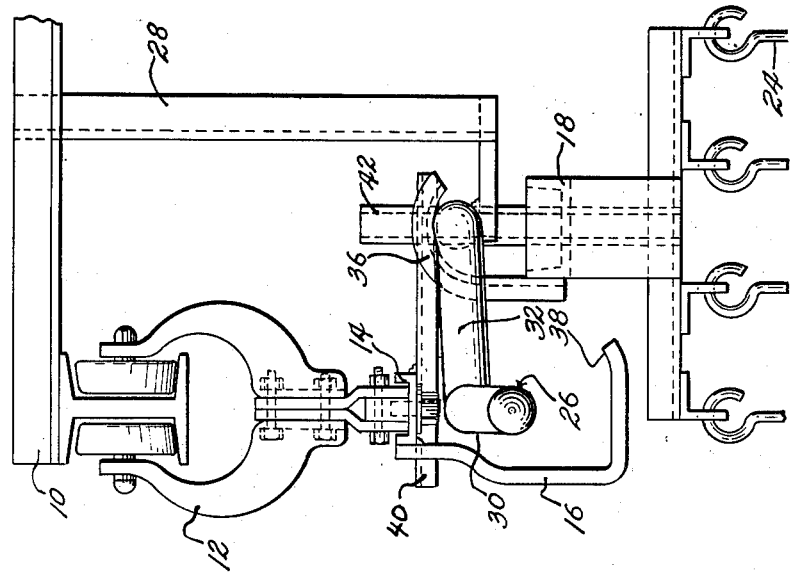
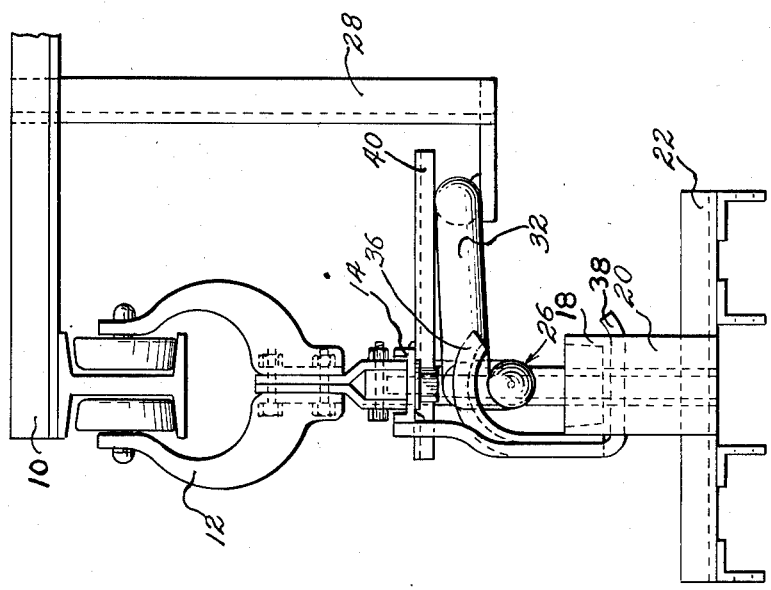
INVENTOR.
John M. Leach Patented Sept. 2, 1952

2,609,083

UNITED STATES PATENT OFFICE 2,609,083

MATERIAL TRANSFER FOR CONVEYERS

John M. Leach, Port Washington, N. Y.

Application March 17, 1951, Serial No. 216,224

2 Claims. (Cl. 198—177)

The present invention relates to conveyors. More particularly, it relates to a mechanism for transferring materials from a conveyor to some other support, which may be another conveyor, and back again, if desired.

It is an object of the present invention to provide a mechanism which will transfer a load off of a conveyor automatically.

It is another object of the present invention to provide a mechanism to transfer a load off of a conveyor, and, if desired, back on again, without the use of moving parts.

It is a further object of the present invention to provide a transfer mechanism which is simple in nature and fool-proof in operation.

Other objects and advantages, if not specifically pointed out, will be apparent to those skilled in the art as a detailed description of the invention proceeds.

For a more detailed description of the invention, reference is made to the accompanying drawings wherein like reference characters refer to the same elements throughout, and in which:

Fig. 2 is an end view of the transfer mechanism of the present invention showing the relation of the load to the conveyor prior to transfer, and Fig. 3 is an end view of the transfer mechanism of the present invention showing the relation of the load to the conveyor subsequent to transfer.

Figure 1:
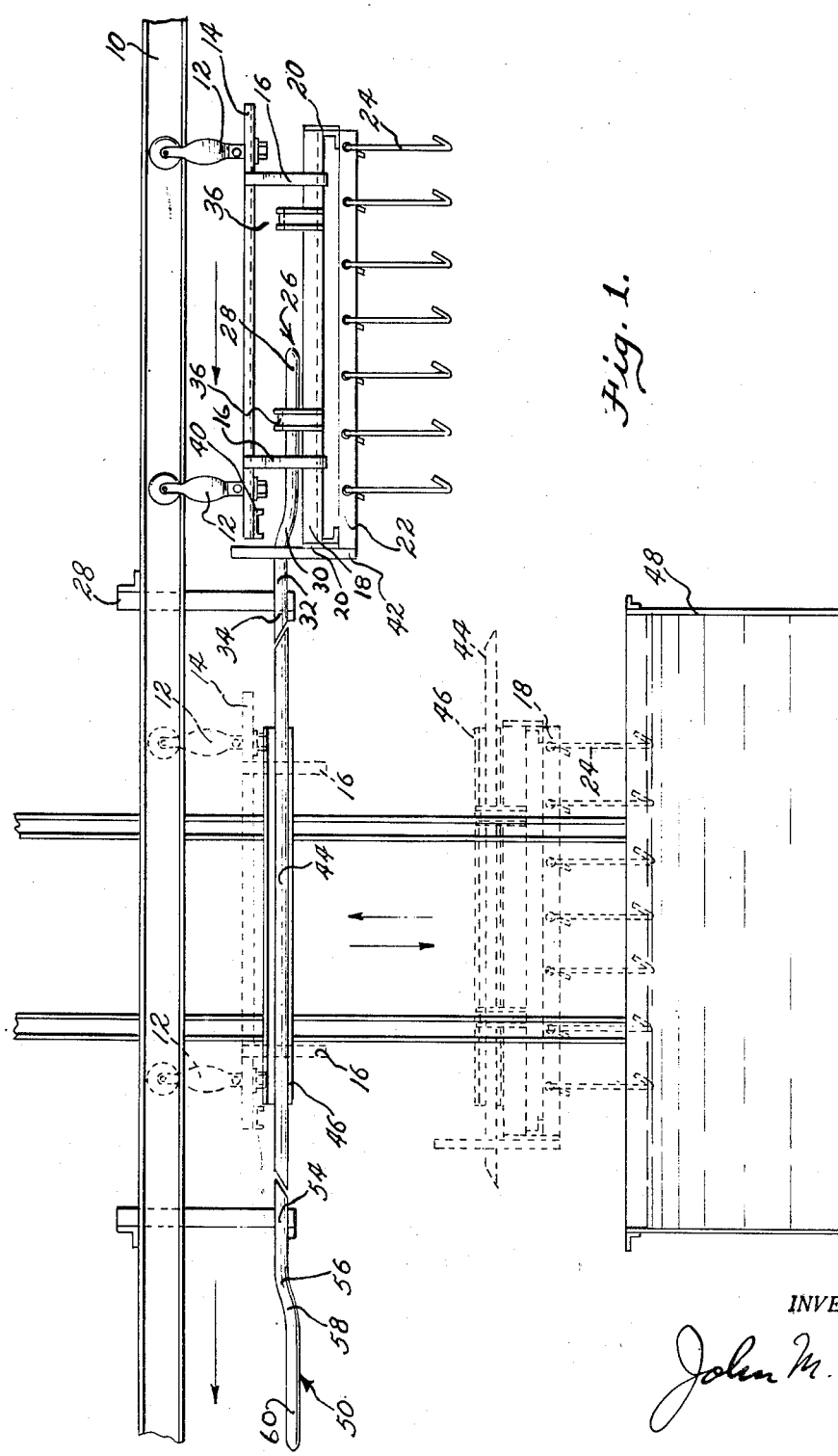
Fig. 1 is a side elevation of a preferred form of the transfer mechanism of the present invention.

The transfer mechanism of the present invention can be used in connection with any type of conveyor but for the purpose of explanation it is illustrated in connection with an overhead monorail type of conveyor in which the supporting member is a structural I beam as shown at 10. Trolleys 12 of the usual well known type run on the I beam and are usually connected together by a chain of some type (not shown).

The trolleys 12 are connected in pairs by a load bar 14 from which a pair of hook members 16 depend, and which support a bar 18 which is suitably connected to plates 20 of any desired type of load carrying rack 22. The rack 22 may be of any shape or type desired or the load may be carried directly by the bar 18. In the drawings the rack 22 is provided with suitable openings in which any desired type of load hook 24 is inserted for the purpose of carrying the articles to be transported.

The trolleys move in the direction of the arrows in Fig. 1 and at any desired point or points in the path of the conveyor a transfer bar 26 is positioned, as, for example, by being supported by a frame 28 of any desired type or shape. The transfer bar 26 has a substantially horizontal section 28, preferably with a pointed end facing in the direction of approach of the conveyor, an inclined section 30, a section which projects to one side of the line of run of the conveyor as shown at 32, and a succeeding horizontal section 34, which latter section may be of any desired length or partake of further deviations in any desired direction to make any desired disposition of the load.

In the modification of the invention illustrated in these drawings, the bar 18 is provided with a pair of hooks 36 which are shaped and positioned so that they pass in succession over the horizontal section 28 of the transfer bar 26. As the first hook 36 passes along this horizontal section 26 it gradually encounters the inclined section 30 of the transfer bar and is raised upwardly and carries with it the bar 18 and the attached load until the bar 18 is lifted above the tops of the upturned ends 38 of the hooks 16. The first of the pair of hooks 36 then gradually encounters the side projecting section 32 of the transfer bar 26 and is moved off to one side and thus moves the load bar 18 from the position shown in Fig. 2 to the position shown in Fig. 3 at which point it is no longer over the hooks 16 and is thus free of the conveyor. The first of the pair of hooks 36 can then be directed in any direction desired by the remaining section 34 of the transfer bar.

The second hook 36 of the pair follows the route of the first hook and when it passes from over the lower hook 16 the bar 18 and the attached load is completely free of the conveyor and can be disposed of as desired.

In the modification of the invention illustrated, movement of the hooks 36 and bar 18 is effected by coaction between a horizontal push bar 40 carried by the load bar 14 and a vertical push bar 42 carried by the bar 18. As the bar 18 moves off of the hooks 16 the vertical push bar 42 rides along the horizontal push bar 40 from the position shown in Fig. 2 to the position shown in Fig. 3.

In the modification shown in this application, the hooks 36 and the bar 18 and load are directed onto a bar 44 of a vertical drop section 46 which is lowered by any desired type of actuating mechanism (not shown) so that the load is dipped into a tank 48 for the purpose of performing any desired operation on the load such, for example, as degreasing, paint dipping, spraying, etching, washing, etc. The actuating mechanism for the rack 46 forms no part of the present invention and may consist of mechanical or electrical driving means, air or hydraulic cylinders or any other desired type of prime mover.

In the illustrated modification of the invention, the hooks 36 and bar 18 and the attached load are moved back onto the conveyor by means of a retransfer bar 50 which exactly reverses the function of the transfer bar 26 in that it has a horizontal section 54 which is substantially in alignment with the drop section bar 44, a side deviation section 56 which moves the bar 18 back over top of the hooks 16, a declined section 58 which lowers the bar 18 back onto the hooks 16 and a substantially horizontal lead off section 60.

In the modification illustrated, the conveyor is usually stopped when the hooks 36 ride onto the bar 44 of the drop section while the load is lowered and starts again when the bar 44 comes back up into position shown in Fig. 1 in solid lines.

Instead of being dropped into a treating tank as illustrated in Fig. 1, the hooks 36, or equivalent elements such as rollers or the like, can be directed by the transfer bar 26 onto a lift section to move the load upwardly, onto another conveyor or a branch section of the same conveyor, merely dropped at that point or disposed of in any other desired manner. In the case where the load is made to part company with the original conveyor, the transfer bar is shaped so that the vertical load bar 42 will completely leave the horizontal load bar 40 and thus permit the bar 18 and/or the attached load to be operated upon by some other moving force or left in a stationary position as desired.

The foregoing description is intended to be merely illustrative of the present invention and many changes and modifications may be made in the physical structure without departing from the spirit of the invention, the scope of which is set forth in the appended claims.

The invention having been described, what is claimed is:

1. A conveyor comprising a supporting means, a mobile means supported by and movable along said supporting means, a hook carried by said mobile means, a load support carried by said hook, an upwardly extending hook carried by the load support, a push-receiving element carried by the load support, a co-acting pusher element carried by the mobile means, and a transfer bar having an end extending into the path of travel of the upwardly extending hook and an inclined section and a laterally deflected section, whereby the upwardly extending hook is moved up the incline of the transfer bar and along the laterally deflected section by the pusher element operating against the push-receiving element when the upwardly extending hook passes over the end of the transfer bar, so as to remove the load support from the hook carried by the mobile means.

2. A conveyor comprising a supporting means, a mobile means supported by and movable along said supporting means, a load support carried by said hook, an upwardly extending hook carried by the load support, a push-receiving element carried by the load support, a co-acting pusher element carried by the mobile means, a transfer bar having an end extending into the path of travel of the upwardly extending hook, an inclined section, a laterally deflected section and an extended horizontal section, whereby the upwardly extending hook is moved up the incline of the transfer bar, along the laterally deflected section and onto the extended horizontal section by the pusher element operating against the push-receiving element when the upwardly extending hook passes over the end of the bar, so as to remove the load support from the hook carried by the mobile means, and means for changing the position of the extended horizontal section of the transfer bar so as to change the position of the load.

JOHN M. LEACH.

REFERENCES CITED

The following references are of record in the file of this patent:

UNITED STATES PATENTS

| Number | Name | Date |
|---|---|---|
| 741,918 | Mackrow et al. | Oct. 20, 1903 |
| 788,543 | Leue | May 2, 1905 |
| 1,460,534 | Cornwall | July 3, 1923 |
| 2,344,155 | McBride et al. | Mar. 14, 1944 |